(12) United States Patent
Noordyk (10) Patent No.: US 12,431,697 B2
(45) Date of Patent: Sep. 30, 2025

(54) UNDERGROUND HANDHOLE BOX HAVING AN OUTER CAVITY WALL

(71) Applicant: INTEGRATED PLASTICS, LLC, Fremont, MI (US)

(72) Inventor: Donald James Noordyk, Fremont, MI (US)

(73) Assignee: Integrated Plastics, LLC, Fremont, MI (US)

( * ) Notice: Subject to any disclaimer, the term of this patent is extended or adjusted under 35 U.S.C. 154(b) by 228 days.

(21) Appl. No.: 18/106,577

(22) Filed: Feb. 7, 2023

(65) Prior Publication Data

US 2024/0266817 A1 Aug. 8, 2024

(51) Int. Cl.
*H02G 9/10* (2006.01)
(52) U.S. Cl.
CPC ...................... *H02G 9/10* (2013.01)
(58) Field of Classification Search
None
See application file for complete search history.

(56) References Cited

U.S. PATENT DOCUMENTS

| | | | |
|---|---|---|---|
| 3,858,755 A | 1/1975 | Tellen | |
| 3,913,400 A | 10/1975 | Floren | |
| 3,921,449 A | 11/1975 | Hauffe et al. | |
| D244,173 S * | 5/1977 | Thurman | D32/37 |
| 4,059,199 A * | 11/1977 | Quaney | H02G 3/14 |
| | | | 411/965 |
| 4,065,020 A | 12/1977 | Carson | |
| 4,163,503 A * | 8/1979 | McKinnon | H02G 9/10 |
| | | | 220/254.3 |
| 5,782,584 A * | 7/1998 | Arthur | H02G 1/14 |
| | | | 52/21 |
| 5,791,098 A * | 8/1998 | Thomas | E02D 29/12 |
| | | | 220/4.28 |
| 6,732,555 B1 * | 5/2004 | Nielsen | H05K 5/0208 |
| | | | 70/416 |
| 6,749,080 B1 | 6/2004 | White | |
| 6,899,240 B2 | 5/2005 | Dang et al. | |
| 7,381,888 B2 | 6/2008 | Burke et al. | |
| 7,385,137 B2 | 6/2008 | Burke et al. | |
| 7,501,573 B2 | 3/2009 | Balfour, Jr. | |
| 9,287,693 B2 | 3/2016 | Burke | |
| 9,346,593 B2 * | 5/2016 | Dang | B21D 53/24 |
| 9,917,427 B2 | 3/2018 | Rost et al. | |
| 2009/0173397 A1 | 7/2009 | Mallela et al. | |
| 2014/0117018 A1 * | 5/2014 | Burke | H02G 9/10 |
| | | | 220/484 |
| 2014/0263343 A1 | 9/2014 | Gerrligs et al. | |
| 2017/0346269 A1 * | 11/2017 | Isaacson | B28B 23/02 |

* cited by examiner

*Primary Examiner* — Krystal Robinson
(74) *Attorney, Agent, or Firm* — Price Heneveld LLP (57) ABSTRACT

An in-ground utility enclosure includes an outer wall. An inner wall is coupled to the outer wall to define a cavity therebetween. The outer wall and the inner wall cooperate to define a bottom opening and a seat that defines a top opening. An internal grid is disposed within the cavity and extends between the outer wall and the inner wall. A cap is selectively disposed on the seat and selectively occupies the top opening.

20 Claims, 11 Drawing Sheets

UNDERGROUND HANDHOLE BOX HAVING AN OUTER CAVITY WALL

FIELD OF THE DISCLOSURE

The present disclosure generally relates to utility enclosures commonly referred to as handhole boxes. More specifically, the present disclosure relates to an underground handhole box having a cavity wall that includes a multi-layer construction with an internal reinforcing grid.

BACKGROUND OF THE DISCLOSURE

Handhole boxes are utilized in underground applications for installing underground cabling, wires, and other utilities. These handhole boxes typically have a cover and define a cavity underground for accessing the various utilities that are installed within the handhole box. These handhole boxes come in various sizes and structural ratings that correspond to different applications and installation locations.

SUMMARY OF THE DISCLOSURE

According to one aspect of the present disclosure, an in-ground utility enclosure includes an outer wall. An inner wall is coupled to the outer wall to define a cavity therebetween. The outer wall and the inner wall cooperate to define a bottom opening and a seat that defines a top opening. An internal grid is disposed within the cavity and extends between the outer wall and the inner wall. A cap is selectively disposed on the seat and selectively occupies the top opening.

According to another aspect of the present disclosure, an in-ground utility enclosure includes an outer wall. An inner wall is coupled to the outer wall to define a cavity therebetween. The outer wall and the inner wall cooperate to define a bottom opening and a seat that defines a top opening. The outer wall and the inner wall include a tapered configuration that flares outward from the top opening to the bottom opening. An internal grid is disposed within the cavity and extends between the outer wall and the inner wall. A cap is selectively disposed on the seat and selectively occupies the top opening.

According to yet another aspect of the present disclosure, an in-ground utility enclosure includes a first outer structure and a second outer structure. The first and second outer structures attach to define an outer wall. The in-ground utility enclosure further includes a first inner structure and a second inner structure. The first and second inner structures attach to define an inner wall. A first grid member is coupled to and extends outward from the first inner structure and a second grid member is coupled to and extends outward from the second inner structure. The first outer structure and the first inner structure are coupled together to form a first cavity wall section with the first grid member positioned therebetween. The second outer structure and the second inner structure are coupled together to form a second cavity wall section with the second grid member positioned therebetween. The first cavity wall section and the second cavity wall section are coupled together at opposing attachment flanges that extend outward from the first cavity wall section and the second cavity wall section to define a structural wall that has a seat that defines a top opening and a bottom opening. A cap is selectively disposed on the seat to close the top opening.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
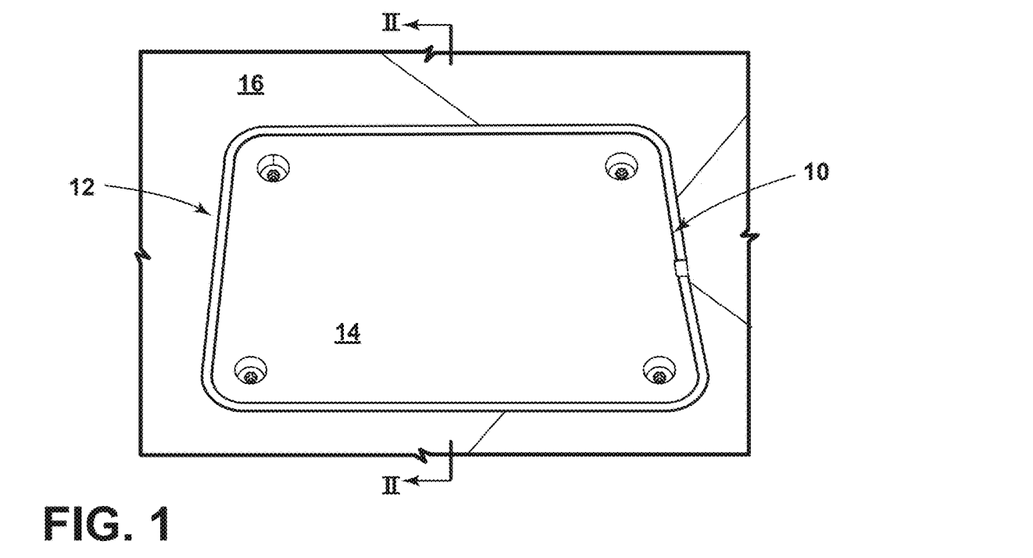
FIG. 1 is a top perspective view of a handhole box installed within a sidewalk and showing the cap installed and at grade level.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a handhole box that includes a multi-layer structural wall that includes inner and outer walls in a reinforcing grid contained within a cavity defined between the inner and outer walls, and also include a cap having a central reinforcing member that is attached to the underside of the cap. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-15, reference numeral 10 generally designates a utility enclosure, which is commonly referred to as a handhole box. The utility enclosure 10 is used for installing and maintaining various utilities in an underground position 12, such as within a field, sidewalk roadway, or other similar location where utilities are maintained underground. The utility enclosure 10 can be installed such that the top surface 14 of the utility enclosure 10 rests at grade level 16 to conceal the utility enclosure 10 and allow pedestrian traffic and vehicular traffic to easily move over and upon the utility enclosure 10. According to the various aspects of the device, the in-ground utility enclosure 10 includes an outer wall 18 and an inner wall 20 that is coupled to the outer wall 18 to define a cavity 22 therebetween. The outer wall 18 and the inner wall 20 cooperate to define a bottom opening 24 and a seat 26 that defines a top opening 28. The inner wall 20 of the utility enclosure 10 defines a maintenance space 30 within which the various utilities can be maintained, installed, repaired, and otherwise manipulated, as needed. An internal grid 32 is disposed within the cavity 22 that is defined between the outer wall 18 and the inner wall 20. The internal grid 32 extends between the outer wall 18 and the inner wall 20. As will be described more fully herein, at least a portion of the internal grid 32 attaches to each of the inner wall 20 and the outer wall 18. A cap 34 is selectively positioned on the seat 26 and selectively occupies the top opening 28.

Referring again to FIGS. 1-15, the general shape of the utility enclosure 10 is that of a truncated rectangular prism. In this manner, the bottom opening 24 is generally larger than the top opening 28. This provides for a sloped or tapered structural wall 40 that extends between the top opening 28 and the bottom opening 24. Using this tapered configuration of the structural wall 40, the utility enclosure 10 can be fixed within the ground. The weight of the ground or other substrate 132, against the structural wall 40 of the utility enclosure 10 provides sufficient downward force such that the utility enclosure 10 is maintained in place in the underground position 12. Accordingly, the top surface 14 of the cap 34 is maintained at grade level 16. Additionally, the utility enclosure 10 can include an outwardly extending base 42 that extends outward from the structural wall 40. This outwardly extending base 42 provides further surface area on which the substrate 132 can be placed to maintain the utility enclosure 10 in a fixed underground position 12.

Referring now to FIGS. 3-15, the structural wall 40 of the utility enclosure 10 includes the outer wall 18, the inner wall 20, and the internal grid 32. These three components are attached together in a fixed configuration to form the structural wall 40. In certain aspects of the device, the internal grid 32 is integrally formed with the inner wall 20. In this manner, the internal grid 32 can be welded, attached, or otherwise coupled with the inner wall 20. It is also contemplated, in certain aspects of the device, that the internal grid 32 and the inner wall 20 are injection molded as a unitary member. In such an aspect of the device, the internal grid 32 extends outward from an outward-facing surface 50 of the inner wall 20. The internal grid 32 extends through the cavity 22 and is attached to the interior surface 52 of the outer wall 18. In this manner, the internal grid 32 is welded to this interior surface 52 of the outer wall 18 to form the unitary structural wall 40. This unitary structural wall 40 made of these components provides a robust and lightweight configuration of the utility enclosure 10 or handhole box.

Referring now to FIGS. 10-15, the internal grid 32 includes a first set 60 of grid walls 62 and a second set 64 of grid walls 62 that are positioned at angles with respect to one another. Typically, the first set 60 of grid walls 62 are positioned generally perpendicular to the second set 64 of grid walls 62. The first set 60 of grid walls 62 extends between the seat 26 that defines the top opening 28 and the base 42 that defines the bottom opening 24. In this manner, the first set 60 of grid walls 62 are positioned generally perpendicular to the cap 34 and the top and bottom openings 28, 24. The second set 64 of grid walls 62 are oriented parallel with the top opening 28 and the bottom opening 24. In certain aspects of the device, the first set 60 of grid walls 62 and the second set 64 of grid walls 62 may be positioned at an angle with respect to one another but not necessarily a perpendicular angle. Various angular orientations are contemplated between the first set 60 of walls and the second set 64 of grid walls 62. It is typical that at least one of the first set 60 of walls or the second set 64 of grid walls 62 is oriented to extend between the top opening 28 and the bottom opening 24.

The first set 60 of grid walls 62 and the second set 64 of grid walls 62 form the internal grid 32 that extends between the inner wall 20 and the outer wall 18. As exemplified in FIGS. 11-15, the first set 60 of grid walls 62 extends between the inner wall 20 and the outer wall 18 and engages both of the inner wall 20 and the outer wall 18. The second set 64 of grid walls 62 extends from the outward-facing surface 50 of the inner wall 20 and extends only partially through the cavity 22 toward the outer wall 18. In this manner, the internal grid 32 forms a series of vertical channels 70 that extend continuously between the top and bottom openings 28, 24 of the structural wall 40. As will be described more fully below, this cavity space 150 and a related cavity channel 16, as described herein, can be used for various utility functions, reinforcing features, combinations thereof, and other similar functionalities.

Through this configuration, the first set 60 of grid walls 62 extends between the seat 26 and the base 42 and can act as a primary buttressing structure of the structural wall 40. The second set 64 of grid walls 62 is positioned to extend between the first set 60 of grid walls 62. Additionally, the second set 64 of grid walls 62 typically extends around the entire perimeter of the outward-facing surface 50 of the inner wall 20 and through the entire cavity 22. Through this configuration, the second set 64 of grid walls 62 operates as a secondary buttressing structure that reinforces and supports the first set 60 of grid walls 62. Stated another way, the second set 64 of grid walls 62 are configured to prevent lateral deflection of the first set 60 of grid walls 62. In turn, the first set 60 of grid walls 62 are configured to prevent inward, outward, or lateral deflection of the outer wall 18 and the inner wall 20 of the structural wall 40. The first set 60 of grid walls 62 further supports the seat 26 in position relative to the base 42 and prevents deflection within the components of the seat 26 and the base 42 relative to one another.

As exemplified in FIGS. 11-15, the interior surface 52 of the outer wall 18 includes a plurality of channels 70. Each of these channels 70 of the plurality of channels 70 receives a corresponding grid wall of the first set 60 of grid walls 62. Through this configuration, each grid wall of the first set 60 is located within a channel that is defined within an interior surface 52 of the outer wall 18. When the first set 60 of grid walls 62 are installed within the corresponding channels 70 of the interior surface 52 of the outer wall 18, the first set 60 of grid walls 62 are welded to the channels 70 of the outer wall 18. These connections are made through various forms of welding, which can include heat welding, sonic welding, vibration-type welding, and other similar forms of welding. It is also contemplated that adhesives, mechanical attachments, combinations thereof, and other similar methods and mechanisms can be utilized for attaching the internal grid 32 to the outer wall 18 and/or the inner wall 20.

Referring now to FIGS. 3-15, the inner wall 20, the internal grid 32, and the outer wall 18 are made up of three distinct components that are attached together to form the structural wall 40. In certain aspects of the device, the utility enclosure 10 can be made up of two-halves that are manufactured and then coupled together as a final manufacturing step. In such an aspect of the device, the utility enclosure 10 can include a first outer structure 80 and a second outer structure 82, where the first and second outer structures 80, 82 can be attached together to define the outer wall 18. The utility enclosure 10 also includes a first inner structure 84 and a second inner structure 86, where the first and second inner structures 84, 86 can be attached together to define the inner wall 20. Also, the utility enclosure 10 includes a first grid member 88 that is coupled to and extends outward from the first inner structure 84 and a second grid member 90 that is coupled to and extends outward from the second inner structure 86. Through this configuration, the first inner structure 84 and the first grid member 88 are integrally formed with one another as described herein. Also, the second grid member 90 and the second inner structure 86 are integrally formed with one another as described herein.

Referring again to FIGS. 3-15, during manufacture of the utility enclosure 10, the first outer structure 80 and the first inner structure 84 are coupled together to form a first cavity wall section 100 with the first grid member 88 positioned therein. The location and attachment of the first grid member 88 is consistent with the methods and mechanisms described herein. The second outer structure 82 and the second inner structure 86 are also coupled together to form a second cavity wall section 102 with the second grid member 90 positioned therein. The first cavity wall section 100 and the second cavity wall section 102 are then coupled together at opposing attachment flanges 104 that extend outward from the first cavity wall section 100 and the second cavity wall section 102. The opposing attachment flanges 104 are attached together and secured using fasteners 106, welding, adhesives, combinations thereof, and other similar methods and mechanisms to secure the first cavity wall section 100 and the second cavity wall section 102 together to form the structural wall 40. As described herein, this structural wall 40 includes the seat 26 that defines the top opening 28 and the base member that defines the bottom opening 24. The cap 34 for the utility enclosure 10 is selectively disposed on the seat 26. When the cap 34 is installed on the seat 26, the top opening 28 is closed to prevent access from above. The cap 34 can be attached to the seat 26 through various fasteners 106 and other fastening mechanisms.

Referring again to FIGS. 1-15, the cap 34 includes a major axis 110 and a minor axis 112. A reinforcing member 114 is attached to the cap 34 and extends across the cap 34 along the minor axis 112. This major axis 110 and minor axis 112 of the cap 34 match the major axis 110 and the minor axis 112 of the top opening 28 of the structural wall 40 for the utility enclosure 10. Through this configuration, the cap 34 can be securely installed on the seat 26 and secured thereto using the fasteners 106. To maintain the cap 34 in a fixed position within the top opening 28, the outer walls 18 includes an outer lip 116 that surrounds the seat 26 and defines a receptacle 118 that receives the cap 34.

Figure 2:
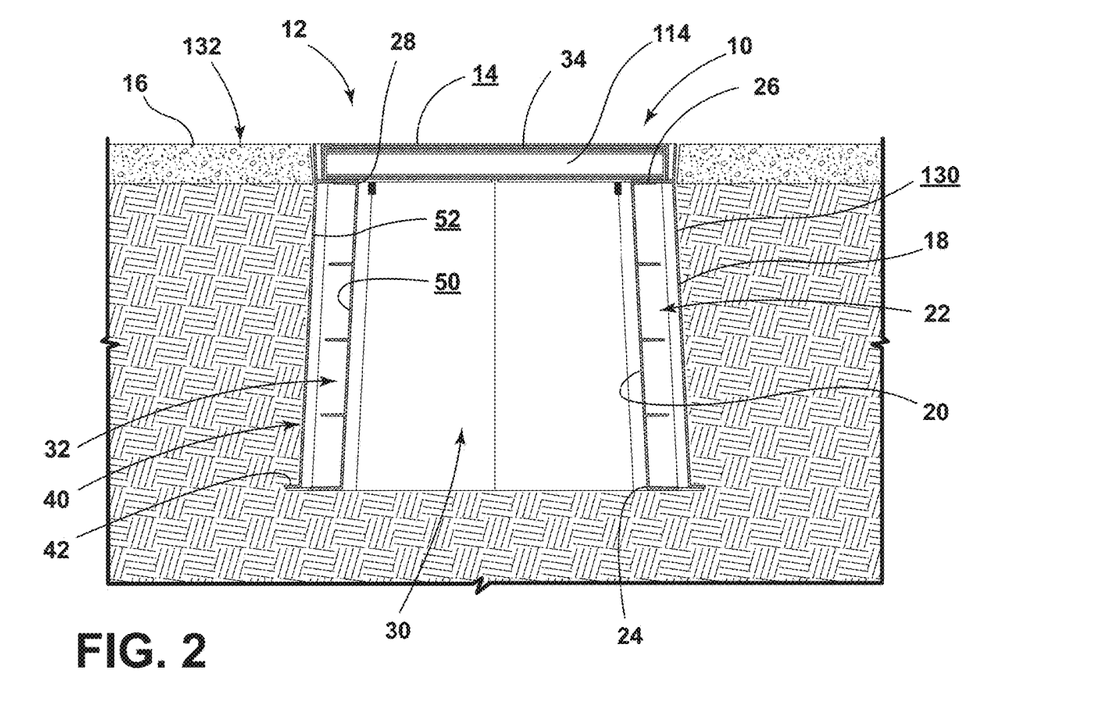
FIG. 2 is a cross-sectional view of a handhole box of FIG. 1 along the line of II-II.
Figure 3:
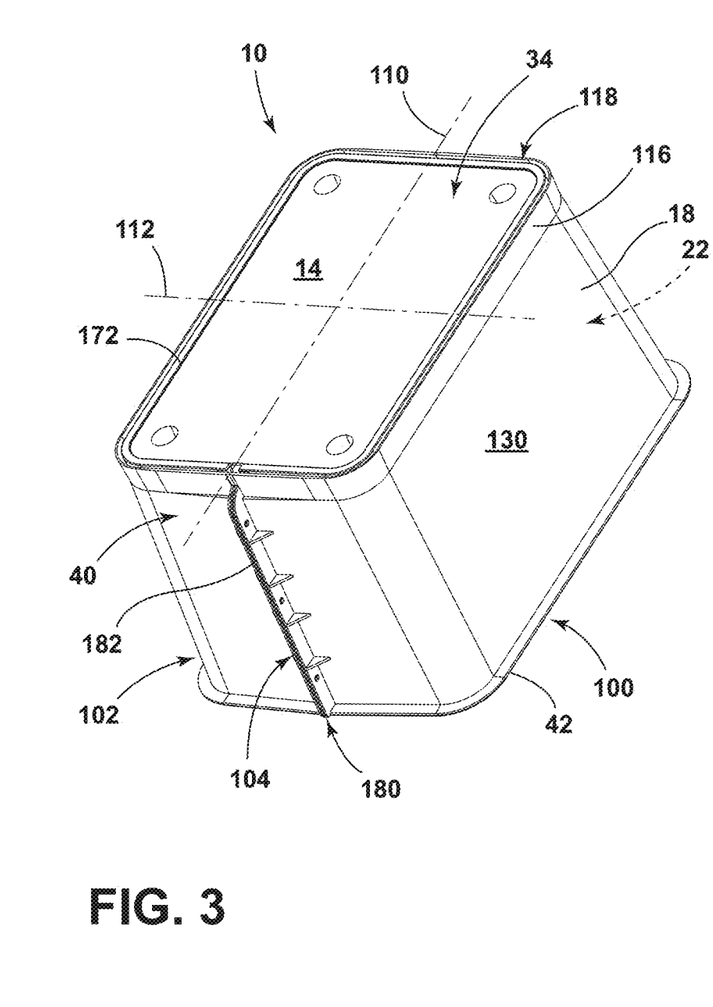
FIG. 3 is a top perspective view of an aspect of the handhole box shown in an assembled state.
Figure 4:
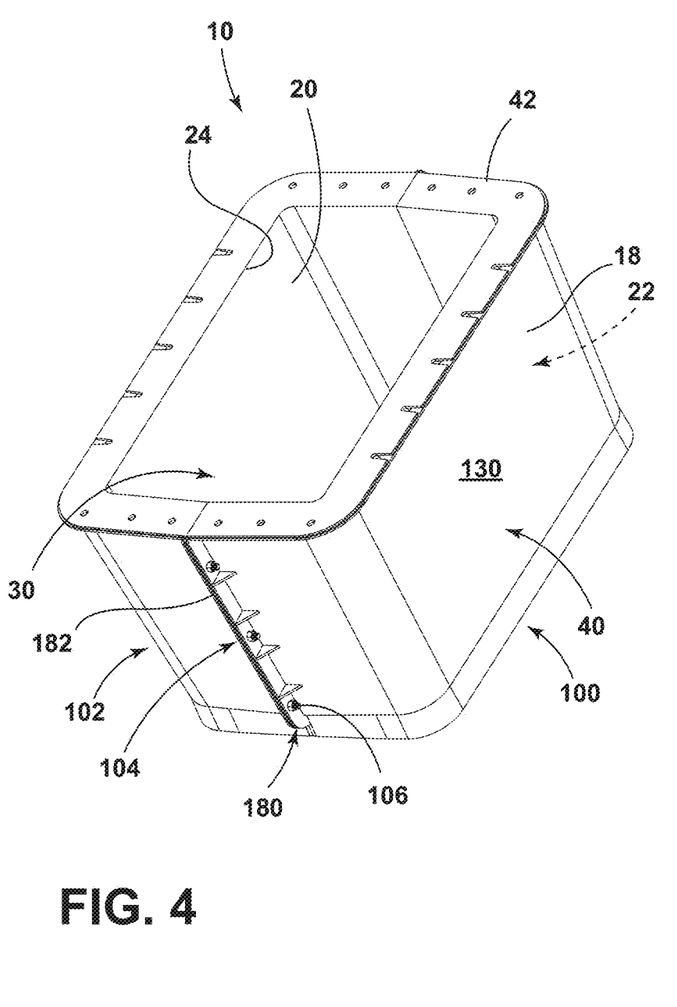
FIG. 4 is a bottom perspective view of a handhole box of FIG. 3.
Figure 5:
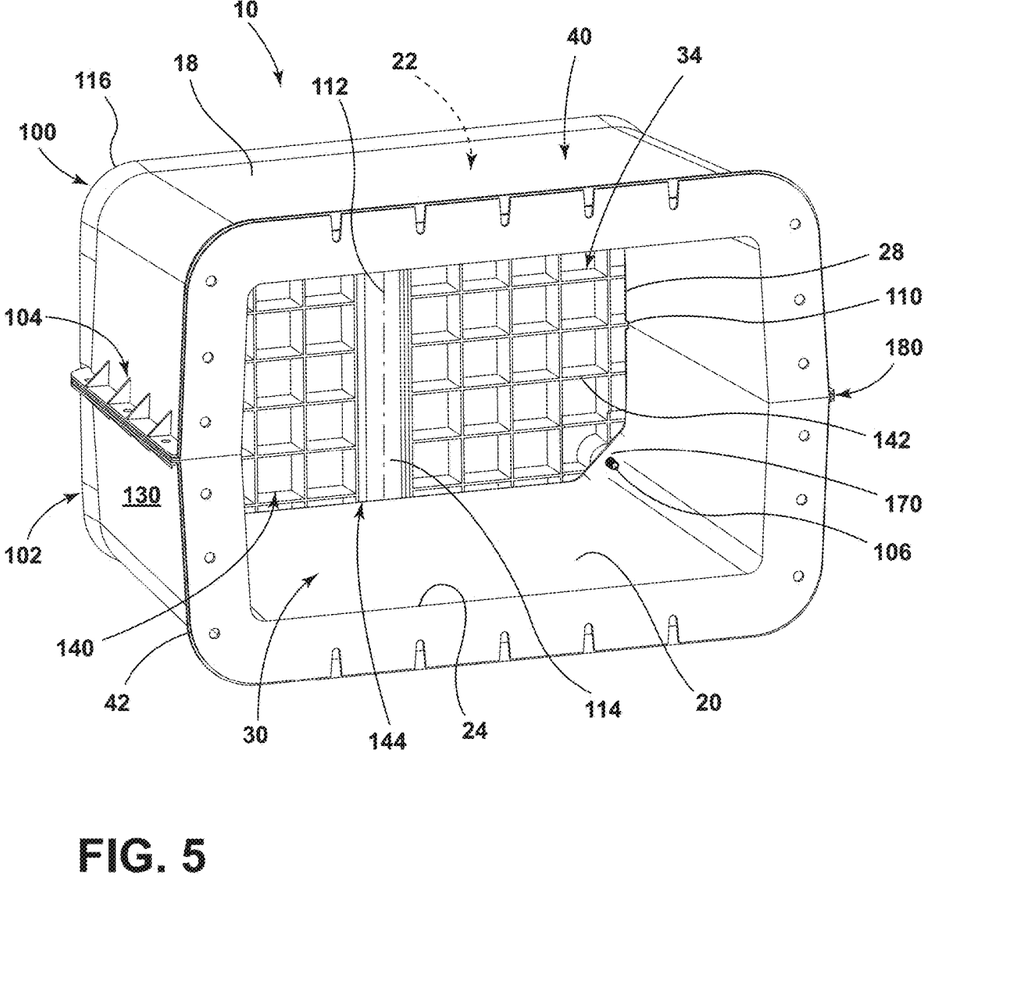
FIG. 5 is another bottom perspective view of the handhole box of FIG. 3 and showing the underside of the cap.
Figure 6:
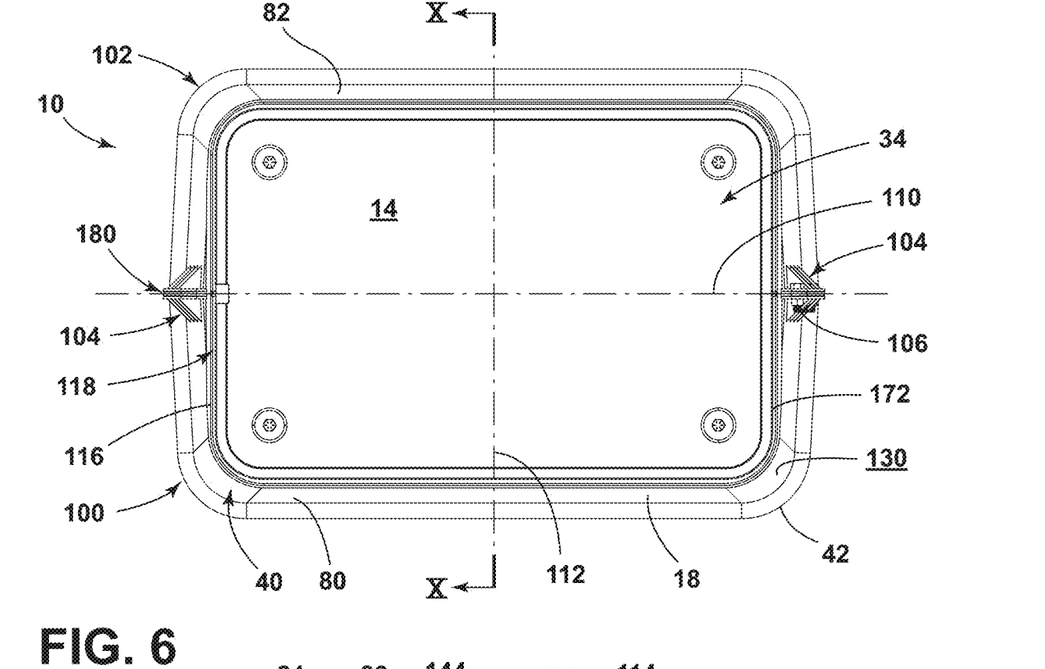
FIG. 6 is a top plan view of the handhole box of FIG. 3.
Figure 7:
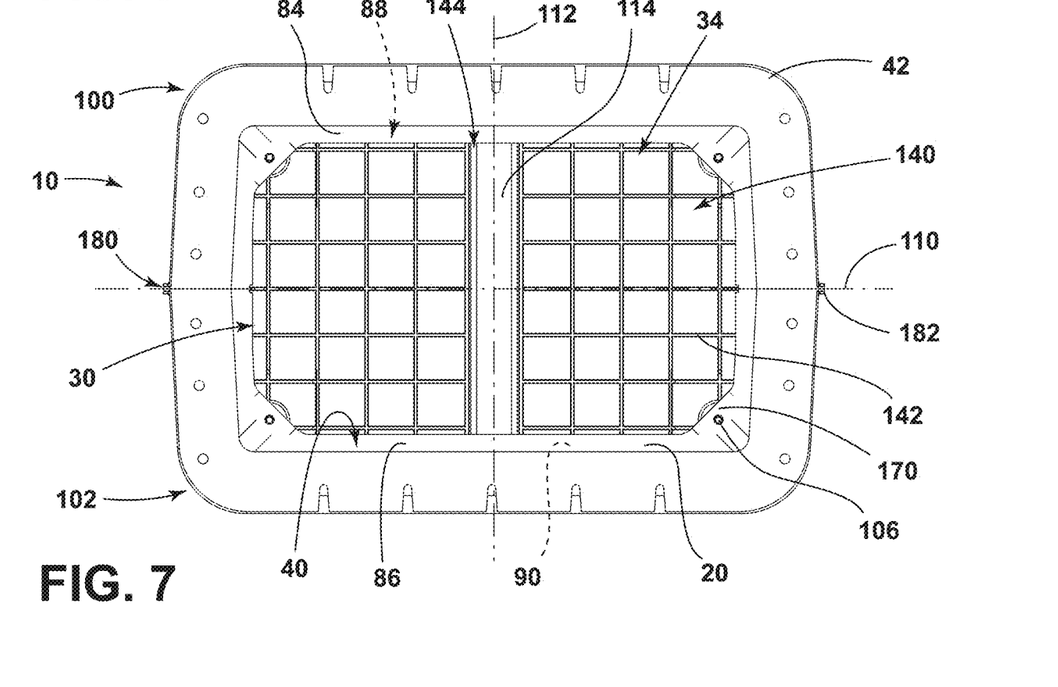
FIG. 7 is a bottom plan view of the handhole box of FIG. 3.
Figure 8:
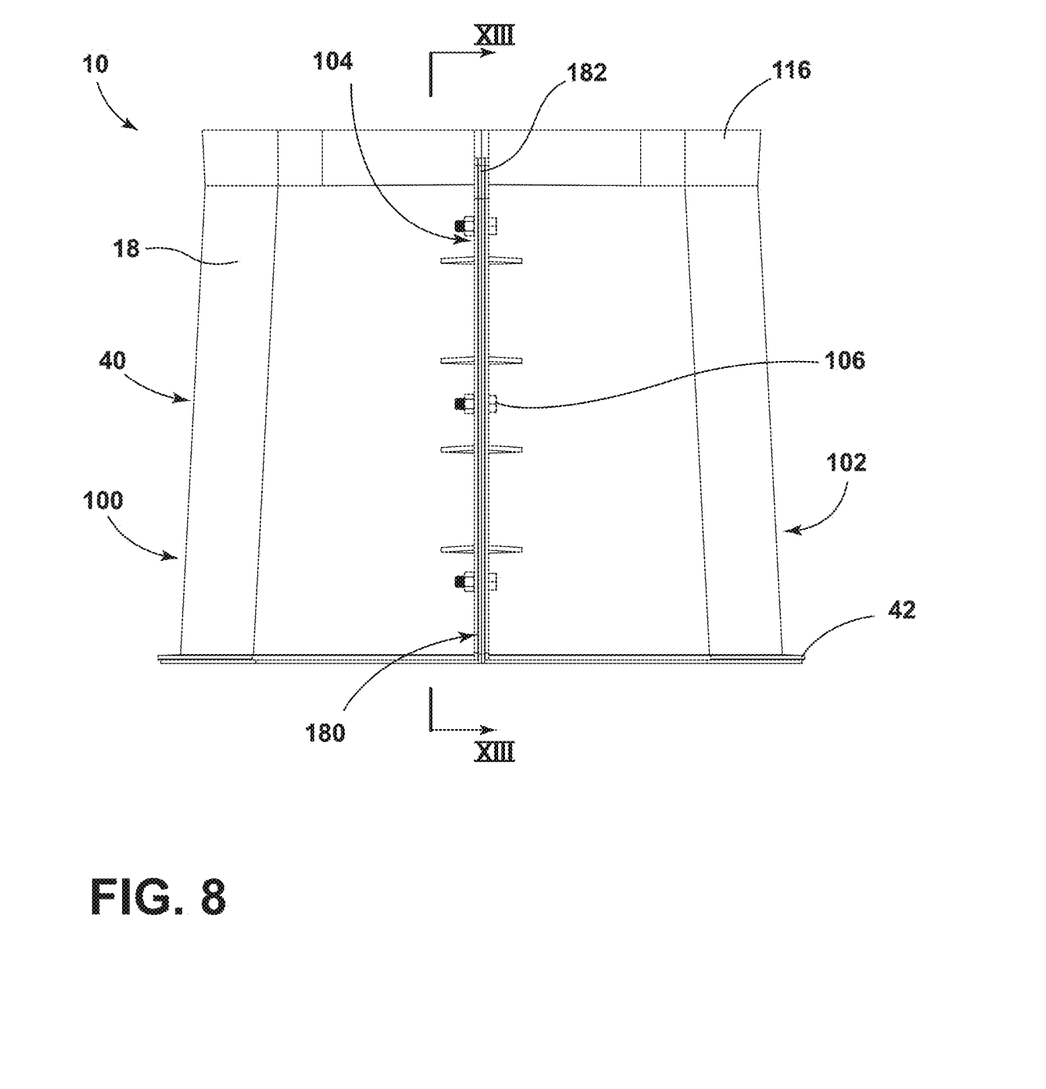
FIG. 8 is a side elevation view of the handhole box of FIG. 3.
Figure 9:
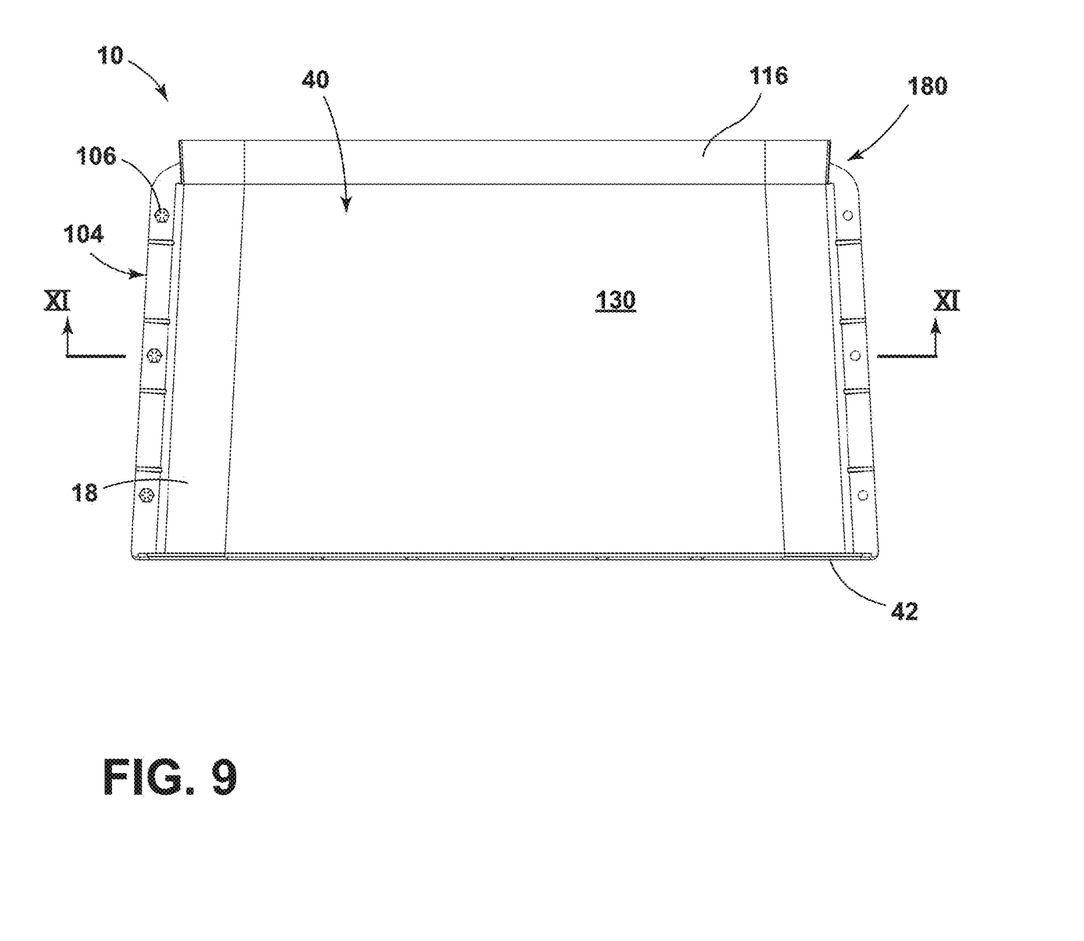
FIG. 9 is another side elevation view of the handhole box of FIG. 3.
Figure 10:
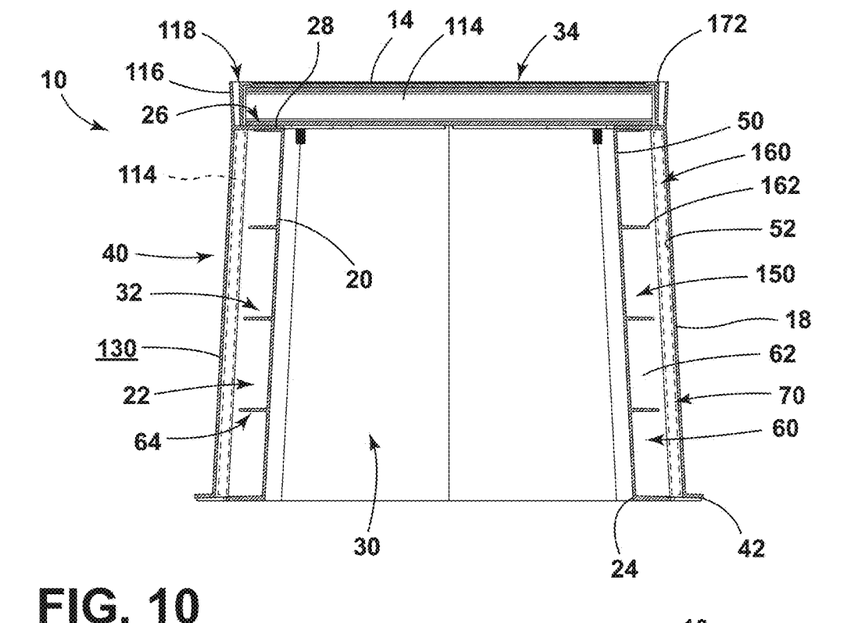
FIG. 10 is a cross-sectional view of the handhole box of FIG. 6 taken along the line of X-X.
Figure 11:
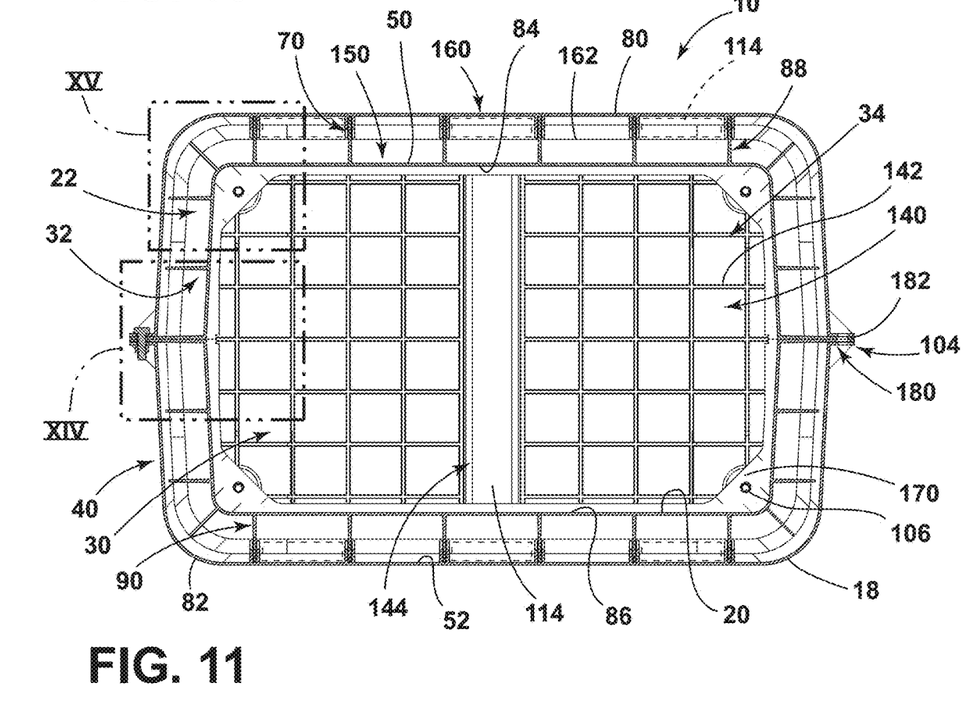
FIG. 11 is a cross-sectional view of the handhole box of FIG. 9 taken along the line of XI-XI.
Figure 12:
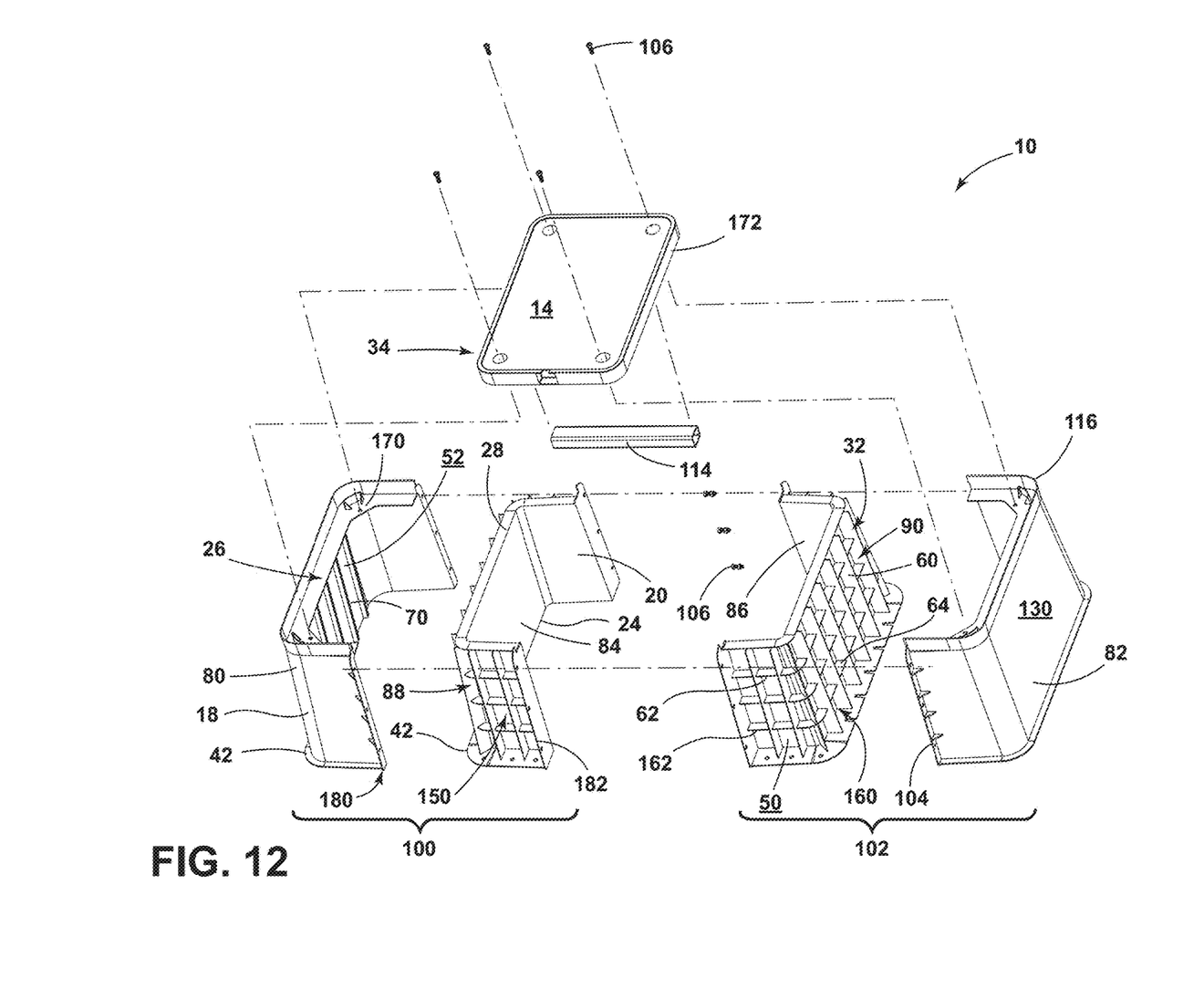
FIG. 12 is an exploded perspective view of the handhole box of FIG. 3 and also showing the handhole box in a disassembled state.
Figure 13:
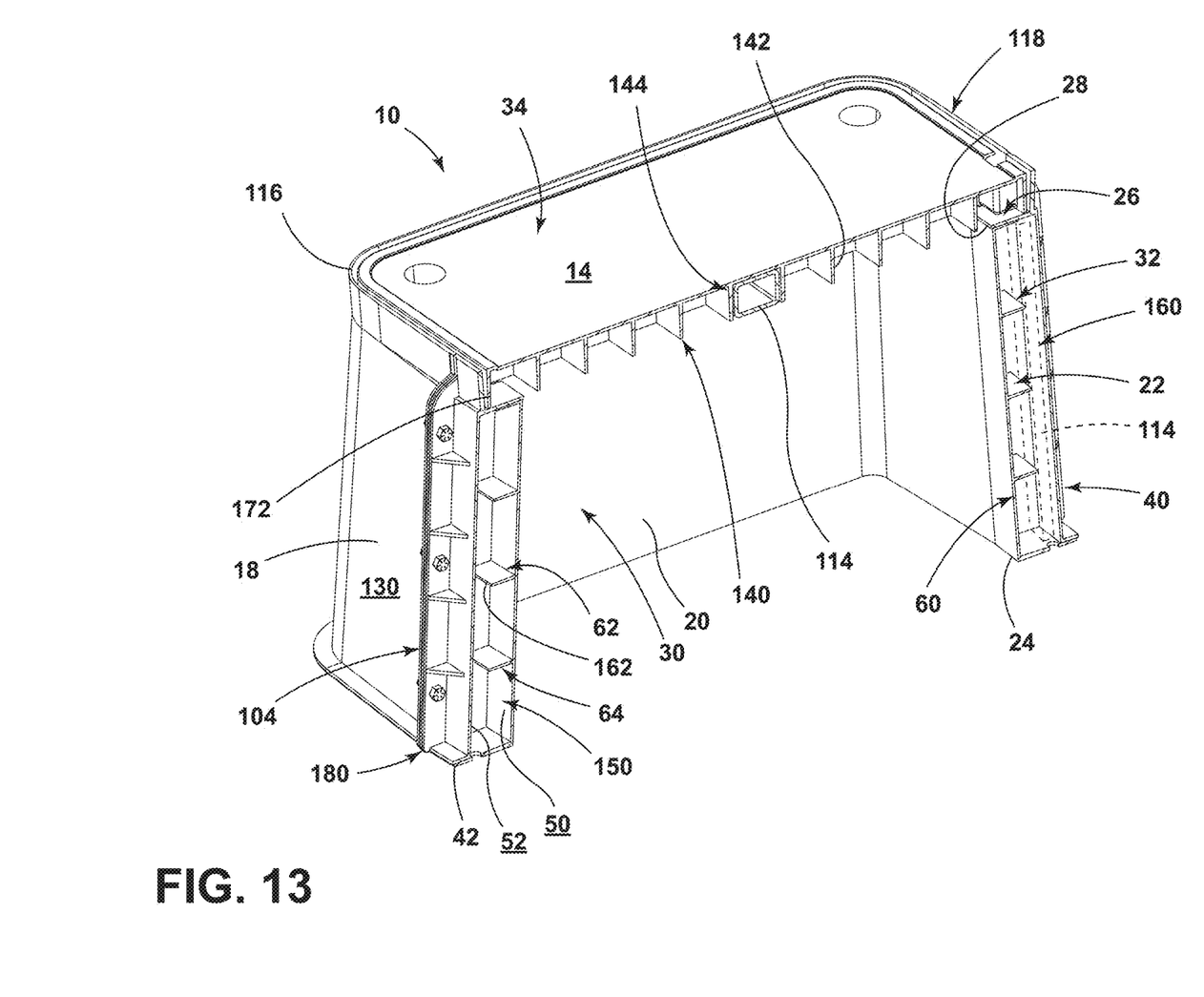
FIG. 13 is a cross-sectional view of the handhole box of FIG. 8 taken along the line XIII-XIII.
Figure 14:
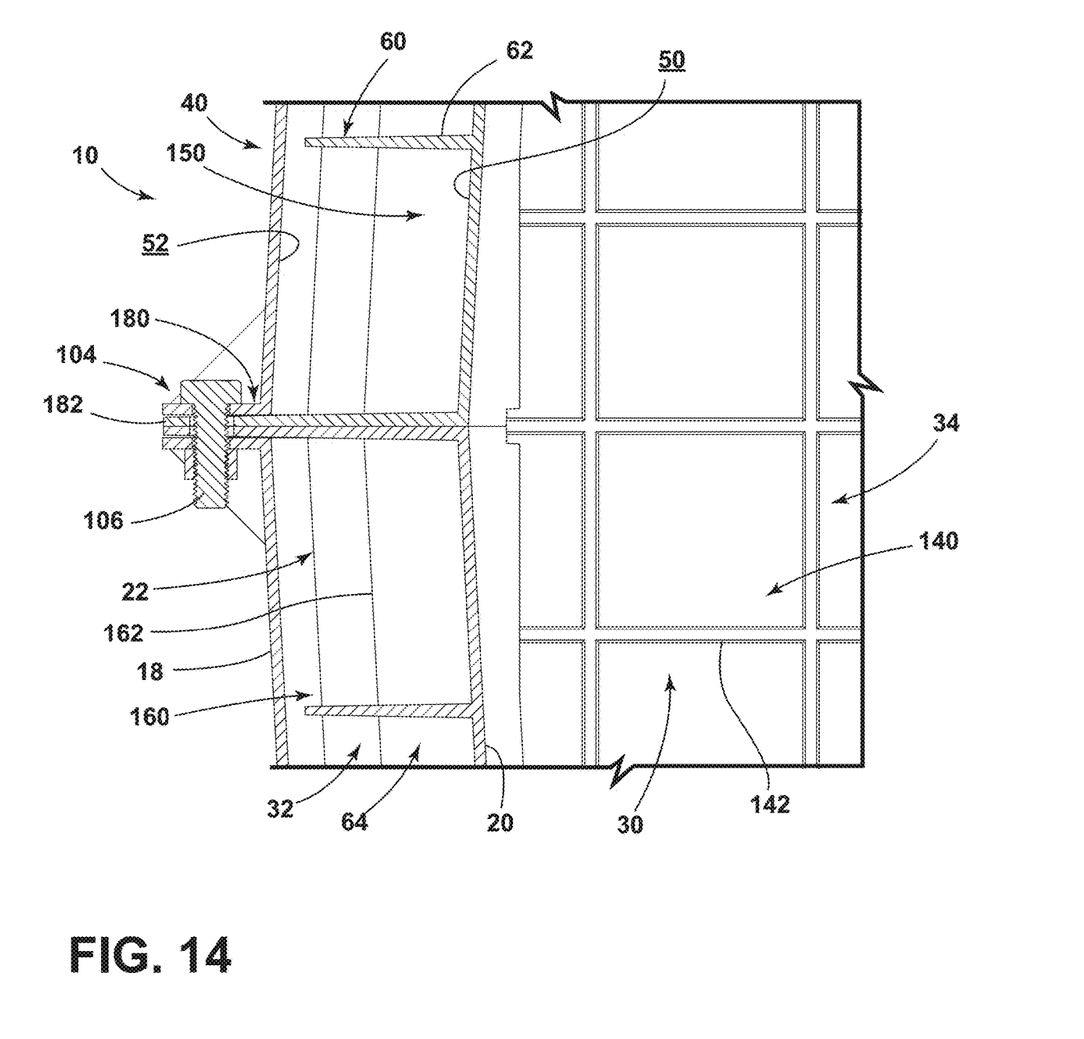
FIG. 14 is an enlarged cross-sectional view of the handhole box of FIG. 11 taken at area XIV.
Figure 15:
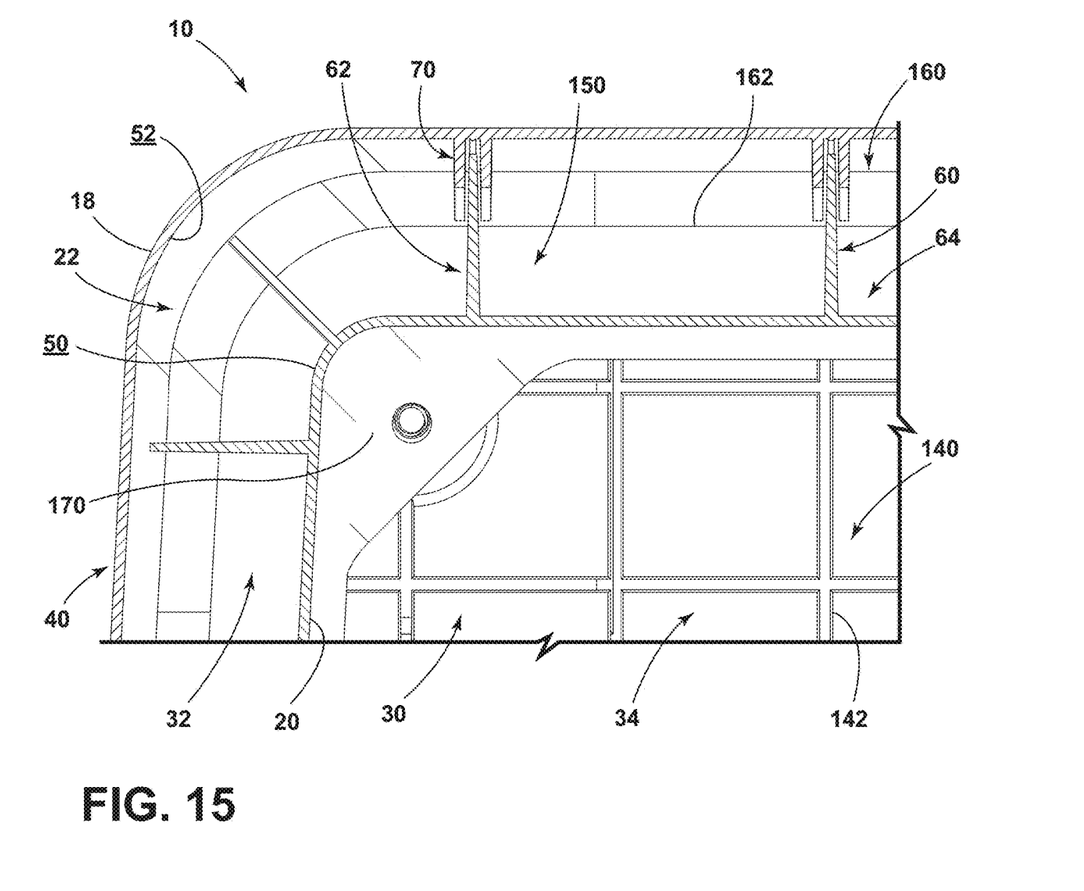
FIG. 15 is an enlarged cross-sectional view of the handhole box of FIG. 11 taken at area XV.

As exemplified in FIGS. 1 and 2, this outer lip 116 also defines an outer surface 130 up to which a substrate 132 can be installed around the utility enclosure 10. This substrate 132 can be in the form of earth, vegetation, concrete, asphalt, and other similar finished and unfinished surfaces that may surround the utility enclosure 10 and within which the utility enclosure 10 is installed. As described herein, the utility enclosure 10 includes a bottom opening 24 that is larger than the top opening 28. Through this configuration, the inner wall 20, the outer wall 18, and the internal grid 32 are positioned in an angled configuration that extends between the top opening 28 and the bottom opening 24. This angled or tapered configuration provides an outer surface 130 onto which the surround substrate 132 can press down to maintain the utility enclosure 10 in the underground position 12 and prevent lifting or heaving of the utility enclosure 10 away from the underground position 12.

According to various aspects of the device, the shape of the utility enclosure 10 can vary depending upon the design necessary for a particular application. Accordingly, in addition to the general rectangular shape exemplified in FIGS. 1-15, the utility enclosure 10 can include a generally square configuration, an arcuate configuration, a circular or oval configuration, an irregular configuration, and other similar configurations that are able to be installed and secured in the underground position 12. Each of the configurations of the structural wall 40 for the handhole box are designed to include the structural wall 40 described herein that includes the inner wall 20, the outer wall 18, and the internal grid 32 that extends therebetween.

Referring again to FIGS. 1-15, the cap 34 includes an underside 140 that defines a plurality of reinforcing walls 142 and the reinforcing space 144 that is adapted to receive the reinforcing member 114. The reinforcing member 114 is attached to the cap 34 via welding, mechanical fasteners 106, adhesives, and other similar attachment methods and mechanisms.

The reinforcing member 114 that is installed within the reinforcing space 144 of the cap 34 can be a pultrusion-type reinforcement that can be made of fiberglass or other fiber-reinforced material. The reinforcing member 114 can also include or can be made of, plastic, resin, composite, combinations thereof, and other similar materials. Where the reinforcing member 114 is made of fiberglass, the reinforcing member 114 is a rigid member that can be made of long-type glass that may be used to provide greater structural integrity for the reinforcing member 114.

According to various aspects of the device, as exemplified in FIGS. 2-15, the seat 26 that is defined within the structural wall 40 is reinforced and supported by each of the inner wall 20, the outer wall 18, and the internal grid 32. Through this configuration, the cap 34 rests within the receptacle 118 that is defined by the seat 26 and the outer lip 116. The seat 26 is supported from below by the inner wall 20, the internal grid 32, and the outer wall 18 such that the structure supporting the cap 34 is comprised of each of the components of the structural wall 40. Accordingly, when the cap 34 is in the installed position, it rests upon and is supported by all three of these components that make up the structural wall 40.

Referring again to FIGS. 1-15, the utility enclosure 10 or handhole box includes the outer wall 18 and the inner wall 20 that is coupled to the outer wall 18 to define the cavity 22 therebetween. The outer wall 18 and the inner wall 20 cooperate to define the bottom opening 24 and a seat 26 that also defines the top opening 28. The outer wall 18 and the inner wall 20 include a tapered configuration that flares outward from the top opening 28 to the bottom opening 24. The internal grid 32 is disposed within the cavity 22 and extends between the outer wall 18 and the inner wall 20. The cap 34 is selectively disposed on the seat 26 and selectively occupies the top opening 28 to enclose the maintenance space 30 of the utility enclosure 10 from above.

The internal grid 32 includes the first set 60 of grid walls 62 and the second set 64 of grid walls 62 that intersect with the first set 60 of grid walls 62 to form a reinforcing grid. The first set 60 of grid walls 62 extends between and engages each of the outer wall 18 and the inner wall 20. The second set 64 of grid walls 62 extends from the internal wall and typically terminates within the cavity 22. In this manner, the second set 64 of grid walls 62, in certain aspects of the device, is typically free of engagement with the outer wall 18.

It is contemplated, in certain aspects of the device, that each of the first set 60 of grid walls 62 and the second set 64 of grid walls 62 each extend between the inner wall 20 and the outer wall 18.

Typically, as described herein, the inner wall 20 and the internal grid 32 are injection molded as a unitary member. The internal grid 32 is then welded to an interior surface 52 of the outer wall 18 to form the unitary structural wall 40 that forms the utility enclosure 10. It is also contemplates that the inner wall 20 and the grid walls 62 that make up the first set 60 and the second set 64 of grid walls 62 can be manufactured through various combinations of injection molding, welding, and attachment via adhesives and attaching mechanisms. By way of example and not limitation, the first set 60 or the second set 64 of the grid walls 62 can be injection molded with the inner wall 20. Subsequently, the other of the first set 60 or the second set 64 of the grid walls 62 can be welded or otherwise attached to the inner wall 20, the outer wall 18 or both.

According to various aspects of the device, the size and shape of the cavity spaces 150 formed by the internal grid 32 can vary. It is typical that the first set 60 of grid walls 62 and the second set 64 of grid walls 62 can form a grid that is within a range of approximately 2 inches wide to approximately 8 inches wide and from approximately 2 inches tall to approximately 8 inches tall. Also, the thickness of the cavity 22 that extends between the outward-facing surface 50 of the inner wall 20 and the interior surface 52 of the outer wall 18 can be within a range of from approximately 2 inch to approximately 6 inches. It should be contemplated that the distances and sizes noted herein are exemplary in nature and any size or range therebetween can also be utilized within the various designs of the utility enclosure 10.

According to various aspects of the device, the reinforcing member 114 is utilized within the cap 34 and is disposed within the reinforcing space 144 of the cap 34. In certain aspects of the device, as exemplified in FIGS. 10 and 11, it is contemplated that aspects of the reinforcing member 114 can be installed within the structural wall 40 for the utility enclosure 10. In such an aspect of the device, the reinforcing members 114 can extend vertically between the seat 26 and the base 42. The various reinforcing members 114 can extend through a cavity channel 160 that is defined between the first set 60 of grid walls 62 and also defined between the outer edge 162 of the second set 64 of grid walls 62 and the interior surface 52 of the outer wall 18. These reinforcing members 114 can extend vertically through the cavity channel 160 of the structural wall 40 and provide additional reinforcement for the structural wall 40. Typically, these reinforcing members 114 can be used for achieving a thinner structural wall 40, while limiting any loss of structural stability of the utility enclosure 10.

According to various aspects of the device, the cap 34 can be installed within the receptacle 118 and can be secured thereto using fasteners 106. These fasteners 106 can attach through the cap 34 and can engage a securing flange 170 that extends inward from the inner wall 20 and into the maintenance space 30. Through this configuration, fasteners 106 that are installed in and through the cap 34 can extend outside of the structural wall 40 to prevent any potential loss of integrity within the structural wall 40 by having fasteners 106 extend therein. Also, this location of the fastening portions within the cap 34 places these fastening portions in an offset position with respect to a perimeter edge 172 of the cap 34. Accordingly, there is sufficient structural integrity maintained within the cap 34 by having the attachment receptacles 118 within an interior portion of the cap 34.

As exemplified in FIGS. 11-15, the opposing attachment flanges 104 that are used to attach the first cavity wall section 100 to the second cavity wall section 102 typically meet at outer ends 180 of the utility enclosure 10. Each of these attachment flanges 104 comprise a series of layers 182 that are made of the first outer structure 80, the second outer structure 82, the first inner structure 84, and the second inner structure 86. Through this configuration, all four of these layers 182 are fastened together to secure the first cavity wall section 100 and the second cavity wall section 102 together. Additionally, because the first inner structure 84 and the second inner structure 86 extend from the outward-facing surface 50 of the inner wall 20 to the attachment flanges 104, these portions of the inner wall 20 extend to and through the outer wall 18 to form a portion of the attachment flanges 104.

It is contemplated that these attachment flanges 104 can be formed and attached together such that subsequent welding operations can be performed with respect to the first set 60 of grid walls 62 and the internal grid 32 and the outer wall 18. It is contemplated that the first cavity wall section 100 and the second cavity wall section 102 can be formed and welded together. Subsequent to the formation in each of the first cavity wall section 100 and the second cavity wall section 102, the sections 100, 102 can be attached together at the attachment flanges 104 and secured to one another via the methods and mechanisms described herein.

According to the various aspects of the device, the various components of the structural wall 40 and the cap 34 can be made of any one of various materials. These materials can include, but are not limited to, plastic, resin, fiberglass, polymers, metallic members, combinations thereof, and other similar generally rigid materials. In addition to the structural wall 40 and cap 34, the seat 26 and the receptacle 118 for receiving the cap 34 can include one or more sealing members that are used to prevent infiltration of materials into the maintenance space 30 of the utility enclosure 10.

According to various aspects of the device, the utility enclosure 10 described herein can be used within handhole boxes of varying sizes and strengths. These sizes can include standardized sizes and configurations, as well as custom-design configurations, as described herein. Additionally, the structure for the utility enclosure 10 described herein can also be used for various structural ratings that can be used within a wide range of materials and locations.

It will be understood by one having ordinary skill in the art that construction of the described disclosure and other components is not limited to any specific material. Other exemplary embodiments of the disclosure disclosed herein may be formed from a wide variety of materials, unless described otherwise herein.

What is claimed is:

1. An in-ground utility enclosure comprising:
    an outer wall;
    an inner wall that is coupled to the outer wall to define a cavity therebetween, the outer wall and the inner wall cooperating to define a bottom opening and a seat that defines a top opening;
    an internal grid that is disposed within the cavity and extending between the outer wall and the inner wall, wherein the internal grid includes a first set of grid walls and a second set of grid walls that are generally perpendicular to the first set of grid walls; and
    a cap that is selectively disposed on the seat and selectively occupies the top opening.

2. The in-ground utility enclosure of claim 1, wherein the internal grid is integrally formed with the inner wall.

3. The in-ground utility enclosure of claim 2, wherein the inner wall and the internal grid are injection molded as a unitary member.

4. The in-ground utility enclosure of claim 2, wherein the internal grid is welded to an interior surface of the outer wall.

5. The in-ground utility enclosure of claim 1, wherein an interior surface of the outer wall includes a plurality of channels, wherein each channel of the plurality of channels receives a corresponding grid wall of the first set of grid walls.

6. The in-ground utility enclosure of claim 5, wherein the second set of grid walls extend from the inner wall and partially extend through the cavity.

7. The in-ground utility enclosure of claim 1, wherein the bottom opening is larger than the top opening.

8. The in-ground utility enclosure of claim 7, wherein the inner wall, the outer wall and the internal grid are positioned in an angled configuration that extends between the top opening and the bottom opening.

9. The in-ground utility enclosure of claim 1, wherein the first set of grid walls extend between the top opening and the bottom opening.

10. The in-ground utility enclosure of claim 9, wherein the second set of grid walls are oriented parallel with the top opening and the bottom opening.

11. The in-ground utility enclosure of claim 1, wherein the cap includes a major axis and a minor axis, and wherein a reinforcing member is attached to the cap and extends across the cap along the minor axis.

12. The in-ground utility enclosure of claim 11, wherein the outer wall includes an outer lip that surrounds the seat and defines a receptacle that receives the cap.

13. The in-ground utility enclosure of claim 11, wherein the cap includes an underside that defines a plurality of reinforcing walls and a reinforcing space that is adapted to receive the reinforcing member.

14. The in-ground utility enclosure of claim 11, wherein the reinforcing member is attached to the cap via welding.

15. An in-ground utility enclosure comprising:
    an outer wall;
    an inner wall that is coupled to the outer wall to define a cavity therebetween, the outer wall and the inner wall cooperating to define a bottom opening and a seat that defines a top opening, wherein the outer wall and the inner wall include a tapered configuration that flares outward from the top opening to the bottom opening;

an internal grid that is disposed within the cavity and extending between the outer wall and the inner wall, wherein the internal grid includes a first set of grid walls and a second set of grid walls that intersects with the first set of grid walls to form a reinforcing grid, and wherein the first set of grid walls extends between and engages each of the outer wall and the inner wall, and the second set of grid walls extends from the inner wall and terminates within the cavity and is free of engagement with the outer wall; and a cap that is selectively disposed on the seat and selectively occupies the top opening.

16. The in-ground utility enclosure of claim 15, wherein the inner wall and the internal grid are injection molded as a unitary member, and wherein the internal grid is welded to an interior surface of the outer wall.

17. The in-ground utility enclosure of claim 15, wherein the cap includes a major axis and a minor axis, and wherein a reinforcing member is attached to the cap and extends across the cap along the minor axis, and wherein the cap includes an underside that defines a plurality of reinforcing walls and a reinforcing space that is adapted to receive the reinforcing member.

18. An in-ground utility enclosure comprising:
a first outer structure and a second outer structure, wherein the first and second outer structures attach to define an outer wall;
a first inner structure and a second inner structure, wherein the first and second inner structures attach to define an inner wall; and
a first grid member that is coupled to and extends outward from the first inner structure and a second grid member that is coupled to and extends outward from the second inner structure, wherein,
the first outer structure and the first inner structure are coupled together to form a first cavity wall section with the first grid member positioned therebetween;
the second outer structure and the second inner structure are coupled together to form a second cavity wall section with the second grid member positioned therebetween;
the first cavity wall section and the second cavity wall section are coupled together at opposing attachment flanges that extend outward from the first cavity wall section and the second cavity wall section to define a structural wall having a seat that defines a top opening and a bottom opening; and
wherein a cap is selectively disposed on the seat to close the top opening.

19. The in-ground utility enclosure of claim 18, wherein the cap includes a major axis and a minor axis, and wherein a reinforcing member is attached to the cap and extends across the cap along the minor axis, and wherein the cap includes an underside that defines a plurality of reinforcing walls and a reinforcing space that is adapted to receive the reinforcing member.

20. The in-ground utility enclosure of claim 19, wherein the reinforcing member is attached to the cap via welding.

* * * * *